(12) United States Patent
Moradmand et al.

(10) Patent No.: US 6,260,678 B1
(45) Date of Patent: Jul. 17, 2001

(54) DIGRESSIVE BASE VALVE FOR AUTOMOTIVE DAMPER

(75) Inventors: Jamshid Kargar Moradmand; Robert Alan Neal, both of Dayton; William R. Nunke, Springboro, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/386,174

(22) Filed: Aug. 31, 1999

(51) Int. Cl.$^7$ ........................................................ F16F 9/34
(52) U.S. Cl. ................ 188/322.14; 188/315; 188/322.13
(58) Field of Search ...................... 188/322.14, 322.13, 188/322.15, 313, 314, 315

(56) References Cited

U.S. PATENT DOCUMENTS

| | | | |
|---|---|---|---|
| 2,717,058 | * 9/1955 | Brundrett | 188/322.15 |
| 3,062,331 | 11/1962 | Wyman . | |
| 3,470,986 | * 10/1969 | Whisler, Jr. | 188/322.15 |
| 3,889,787 | * 6/1975 | Zehring et al. | 188/315 |
| 3,945,474 | * 3/1976 | Palmer | 188/322.13 |
| 4,401,196 | 8/1983 | Grundei . | |
| 4,610,332 | * 9/1986 | Mourray | 188/322.15 |
| 4,646,883 | * 3/1987 | Tanaka | 188/322.15 |
| 4,721,130 | * 1/1988 | Hayashi | 188/322.15 |
| 4,768,629 | * 9/1988 | Wossner | 188/322.14 |
| 4,775,038 | * 10/1988 | Unnikrishnan et al. | 188/322.15 |
| 4,809,829 | * 3/1989 | Hummel et al. | 188/322.15 |
| 4,964,493 | * 10/1990 | Yamaura | 188/322.15 |
| 4,971,181 | 11/1990 | Zaenglein et al. . | |
| 5,042,624 | * 8/1991 | Furuya et al. | 188/322.15 |
| 5,577,579 | * 11/1996 | Derr | 188/322.14 |
| 5,638,927 | * 6/1997 | Cheatham et al. | 188/322.19 |
| 5,738,190 | * 4/1998 | Deferme | 188/322.15 |
| 5,934,422 | * 8/1999 | Steed | 188/322.13 |

FOREIGN PATENT DOCUMENTS

| | | |
|---|---|---|
| 1032609 | 7/1956 | (DE) . |
| 3721915 | 1/1988 | (DE) . |
| 2234038 | 1/1994 | (GB) . |

* cited by examiner

*Primary Examiner*—Robert J Oberleitner
*Assistant Examiner*—Devon Kramer
(74) *Attorney, Agent, or Firm*—Robert M. Sigler

(57) ABSTRACT

A base valve assembly fore regulating the flow of fluid through a twin tube fluid vehicle damper is provided. The base valve assembly has opposing compression and rebound surfaces. Inner and outer annular seats extend from the compression surface and define an annular channel therebetween. At least one fluid passageway connects the annular channel and the rebound surface for providing fluid communication therebetween. A connector secures a blow-off valve to the cylinder end. The blow-off valve has a hollow cylindrical portion with a flange extending transversely from an end thereof. The flange is adjacent the annular seats when the blow-off valve is in a closed position. The blow-off valve is movable from the closed position to an open position away from the compression surface. A helical spring is interposed between the connector and the blow-off valve for biasing the blow-off valve to the closed position. A low speed compression bypass valve is interposed between the annular channel and the blow-off valve for permitting fluid to exit the annular channel past the blow-off valve when the blow-off valve is in the closed position. The blow-off valve provides performance during compression of the damper.

16 Claims, 5 Drawing Sheets

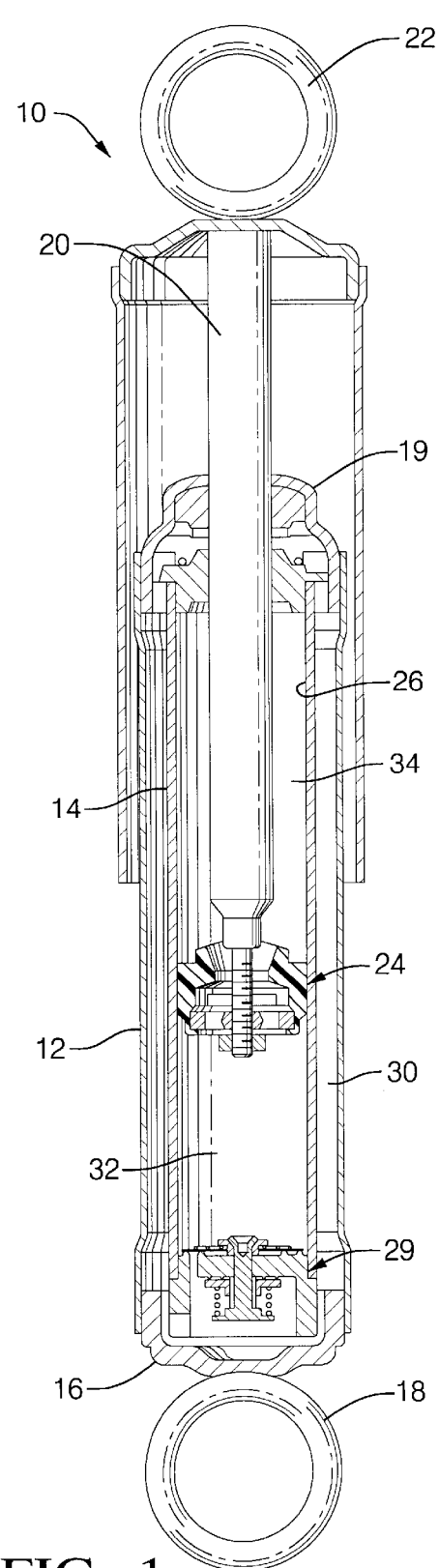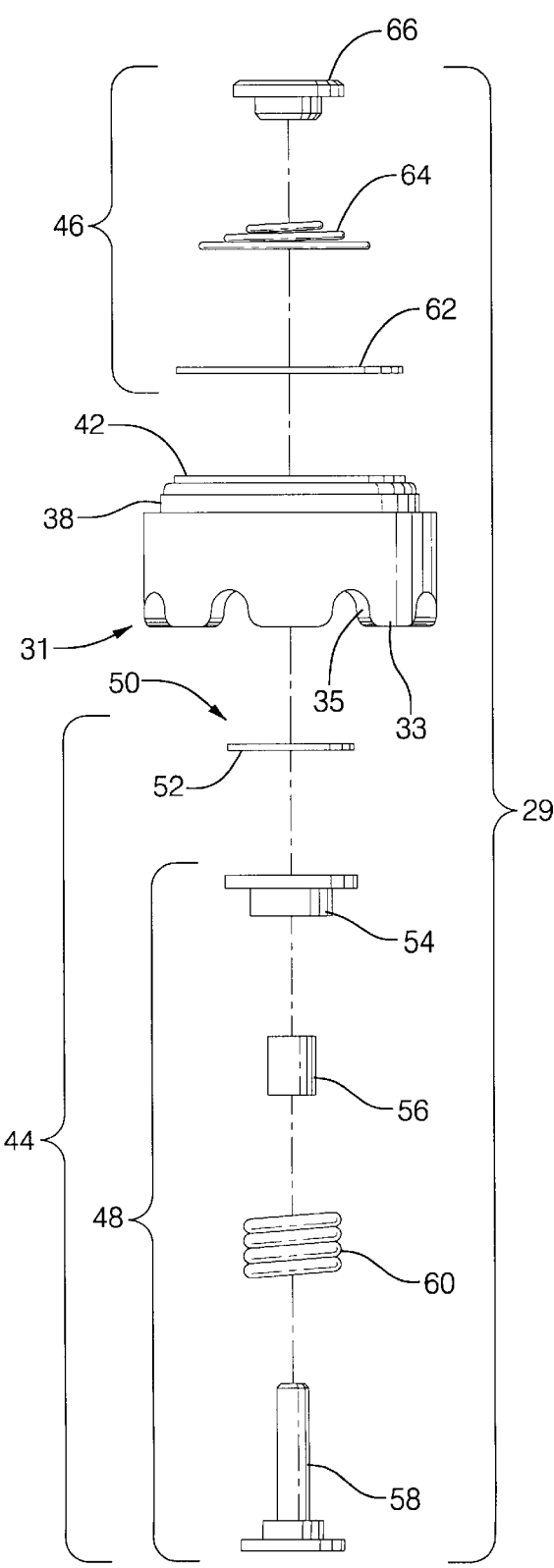
FIG. 1　　　　　　　　　　　　　　　　　　FIG. 2

DIGRESSIVE BASE VALVE FOR AUTOMOTIVE DAMPER

RELATED APPLICATIONS

This application is related to Applicants' co-pending application entitled "Internally Slotted Orifice Disc for Low Speed Control in Automotive Dampers" having U.S. Ser. No. 03/387,335 filed on the same date as the present application. Each application is directed to a different invention.

TECHNICAL FIELD

This invention relates to fluid dampers for vehicles, and more specifically, to a blow-off valve for use on a base valve assembly to provide digressive performance during compression of the damper.

BACKGROUND OF THE INVENTION

Fluid vehicle dampers, such as hydraulic shock absorbers and struts, provide a smooth ride by absorbing forces that are generated by an uneven road surface. Two common types of vehicle fluid dampers are mono-tube and twin tube shock absorbers, each of which have a cylinder and piston. Twin tube shock absorbers have a valve body located at an end of the piston, commonly referred to as a piston valve, and at a cylinder end, commonly referred to as a base valve. The piston valve moves toward the base valve during compression of the shock absorber and moves away from the base valve during rebound. The valve bodies divide the shock absorbers into several fluid chambers and regulate the flow of fluid from one chamber to another thereby achieving particular ride handling characteristics. Typically, each valve body has a compression and rebound valve assembly located on opposing surfaces of the valve body that regulate fluid flow during the compression and rebound strokes. By modifying the valve assemblies, the ride handling characteristics may be calibrated.

It is desirable to have different rates of piston damping depending on vehicle ride condition. For example, during vehicle cornering maneuvers in which the piston undergoes low speed compression, it is desirable to have stiff ride handling characteristics. Conversely, when the vehicle travels over pot holes at relatively high vehicle speeds in which the piston undergoes high speed compression, it is desirable to have soft ride handling characteristics. The base valve assembly is the primary control of damping during compression. One way to best achieve different rates of damping is to provide a base valve assembly having digressive performance, that is, a base valve which provides generally independent and distinct damping rates during low and high speed piston compression. Prior art base valve assemblies have only provided low and high piston speed damping rates which are dependent on one another thereby compromising ride handling characteristics at low and high vehicle speeds. Therefore, what is needed is a base valve assembly that provides digressive performance.

SUMMARY OF THE INVENTION

The present invention provides a base valve assembly for regulating the flow of fluid through a twin-tube fluid vehicle damper. The base valve assembly has opposing compression and rebound surfaces. Inner and outer annular seats extend from the compression surface and define an annular channel therebetween. At least one fluid passageway connects the annular channel and the rebound surface for providing fluid communication therebetween. A connector secures a blow-off valve to the cylinder end. The blow-off valve has a hollow cylindrical portion with a flange extending transversely from an end thereof. The flange is adjacent the annular seats when the blow-off valve is in a closed position. The blow-off valve is movable from the closed position to an open position away from the compression surface. A helical spring is interposed between the connector and the blow-off valve for biasing the blow-off valve to the closed position. A low speed compression bypass valve is interposed between the annular channel and the blow-off valve for permitting fluid to exit the annular channel past the blow-off valve when the blow-off valve is in the closed position. The blow-off valve provides performance during compression of the damper.

Accordingly, the present invention provides a base valve assembly that provides digressive performance with generally independent and distinct damping rates during low and high speed piston compression.

BRIEF DESCRIPTION OF THE DRAWINGS

FIG. 1 is a cross-sectional view of a fluid vehicle damper according to the present invention;

FIG. 2 is an exploded view of a valve assembly shown in FIG. 1;

DESCRIPTION OF THE PREFERRED EMBODIMENT

Figure 3:
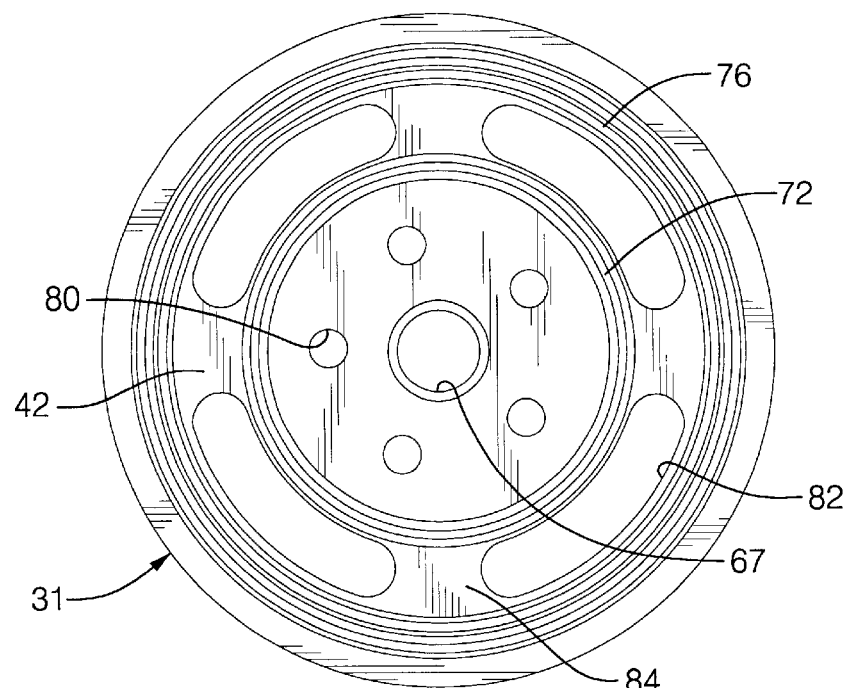
FIG. 3 is a bottom elevational view of a cylinder end shown in FIG. 2.

A fluid vehicle damper or, more specifically, a twin tube shock absorber is generally shown at 10 in FIG. 1. The damper 10 has a reservoir tube 12 and a cylinder 14 disposed within the reservoir tube 12. A lower portion 16 of the reservoir tube 12 has a lower connection 18 for attachment to a suspension component (not shown). An upper portion 19 of the reservoir tube 12 slidably receives a piston rod 20 to which an upper connection 22 is attached. The upper connection 22 is typically attached to a portion of the vehicle s frame (not shown). The suspension component (not shown) moves relative to the frame (not shown) as the vehicle travels over uneven road surfaces thereby moving the piston rod 20 within the cylinder 14.

A piston valve assembly is schematically shown at 24 and is attached to the rod 20 opposite the upper connection 22. An interior wall 26 of the cylinder 14 slidably receives the piston valve assembly 24. A base valve assembly 29, is secured to an end 27 of the cylinder 14 and abuts the lower portion 16. The base valve assembly 29 separates the cylinder 14 from the reservoir tube 12 and defines a first fluid chamber, or reservoir chamber 30, and a second fluid chamber, or compression chamber 32. The base valve assembly 29 has a base valve body 31 that includes a downwardly depending annular flange 33 with a plurality of notches 35 (best shown in FIG. 2) that permit fluid to flow uninhibited between the reservoir 30 and compression 32 chambers. The base valve body 29 is typically formed from powdered metal. The piston valve assembly 24 separates the compression chamber 32 from a rebound chamber 34. Hydraulic fluid in the chambers 30, 32, 34 dampens forces as the fluid passes through the piston 24 and base 29 valve assemblies and their associated valve assemblies, which are discussed in more detail below. The base valve assembly 29 primarily controls the compression characteristics of the damper 10, while the piston valve assembly 24 primarily controls the rebound characteristics of the damper 10.

The valve body 31 includes an outer surface 38 adjacent to the interior wall 26 of the cylinder 14 and includes first 40 and second 42 opposing surfaces. The reservoir chamber 30 and compression chamber 32 are adjacent to the first 40 and second 42 surfaces, respectively. Referring to FIG. 2, the base valve assembly 29 includes a compression valve assembly 44 that regulates the flow of fluid from the compression chamber 32 to the reservoir chamber 30 during compression of the damper 10 and is the primary control of damping during compression. The base valve assembly 29 also includes a rebound valve assembly 46 that regulates the flow of fluid from the reservoir chamber 30 to the compression chamber 32 during rebound of the damper 10. As is well known in the art, fluid flow in and out of reservoir chamber 30 is caused by the differing rates of volume change in compression chamber 32 and rebound chamber 34 as rod 20 moves in and out of rebound chamber 34.

The compression valve assembly 44 includes a high speed bypass valve assembly 48 and low speed bypass valve assembly 50. The high speed bypass valve assembly 48 provides high speed damping and includes a blow-off valve 54, a spacer sleeve 56, and a spring 60, which are secured to the valve body 31 by a connector 58. The connector 58 may be a rivet as shown, a nut and bolt, or any suitable fastening device. The rivet 58 is received in a central bore 67 (shown in FIGS. 3–5) in the valve body 31. The high speed bypass valve assembly 48 is discussed in greater detail below. The low speed bypass valve assembly 50 has an orifice disc 52 which works in conjunction with the valve body 31 to provide low speed damping. The orifice disc 52 is typically made from a high strength spring steel.

The rebound valve assembly 46 has a rebound disc 62 adjacent to the second surface 42. The rebound disc 62 is biased toward the second surface 42 by a coil spring 64 which is secured to the valve body 31 by a retainer 66 and the rivet 58. The rivet 58 has an end with a cylindrical depression received within a central hole in the retainer 66 so that the end may be deformed to retain the valve assemblies 44, 46, 48, 50 onto the valve body 31. The rebound valve assembly 46 permits fluid to flow from the reservoir chamber 30 to the compression chamber 32 at a predetermined rate.

Figure 4:
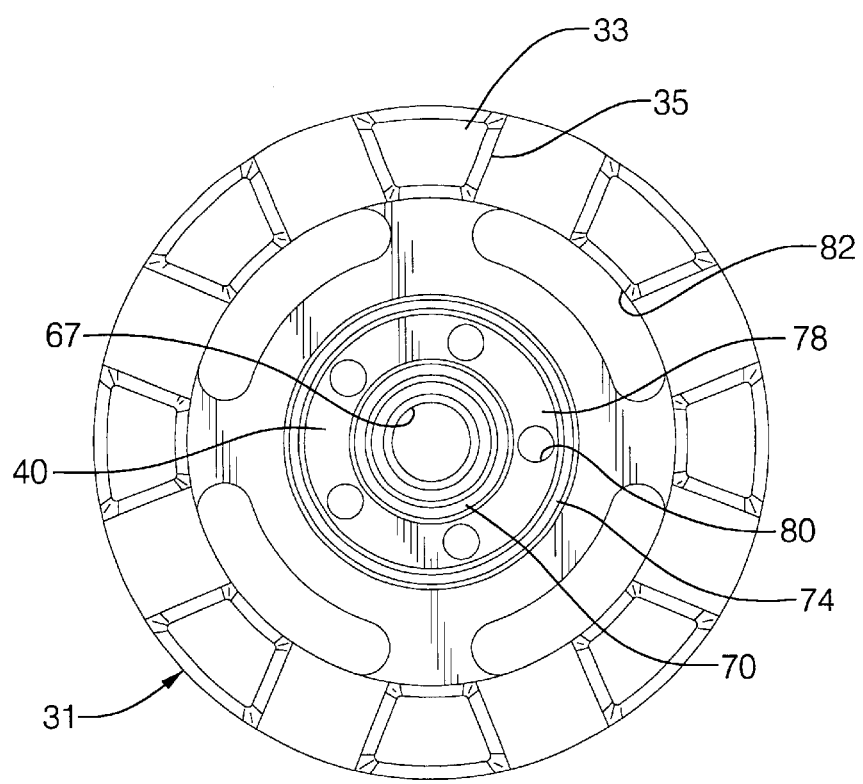
FIG. 4 is a top elevational view of the cylinder end shown in FIG. 3.

Referring now to FIGS. 3 and 4, the first 40 and second 42 surfaces of the valve body 31 have inner 70, 72 and outer 74, 76 annular seats, respectively, for sealing engagement with the discs 52, 62, respectively. The inner 70 and outer 74 annular seats extend from the first surface 40 and define an annular channel 78 therebetween. At least one fluid passageway 80 connects the annular channel 78 and second surface 42 for providing fluid communication therebetween during compression of the damper 10. Preferably, the valve body 31 has a plurality of the fluid passageways 80 spaced radially about the bore 67. The fluid passageways 80 may have a circular cross-section as shown, or any other suitable cross-section, such as an arcuate cross-section. It is to be understood that a different type of low speed bypass valve may be used other than the one depicted in the Figures. For example, coined slots or notches pressed into the outer annular seat 74 may be used to permit fluid to exit the annular channel 78 into the reservoir chamber 30.

The valve body 31 also has rebound fluid passageways 82 connecting the first 40 and second 42 surfaces for providing fluid communication therebetween during rebound of the damper 10. The rebound passageways 82 are spaced radially about the bore 67 and are interposed between the inner 72 and outer 76 annular seats, which define a rebound annular channel 84. These passageways permit fluid to move from the reservoir chamber 30 back to the compression chamber 32 after compression, which is discussed in more detail below.

Figure 5:
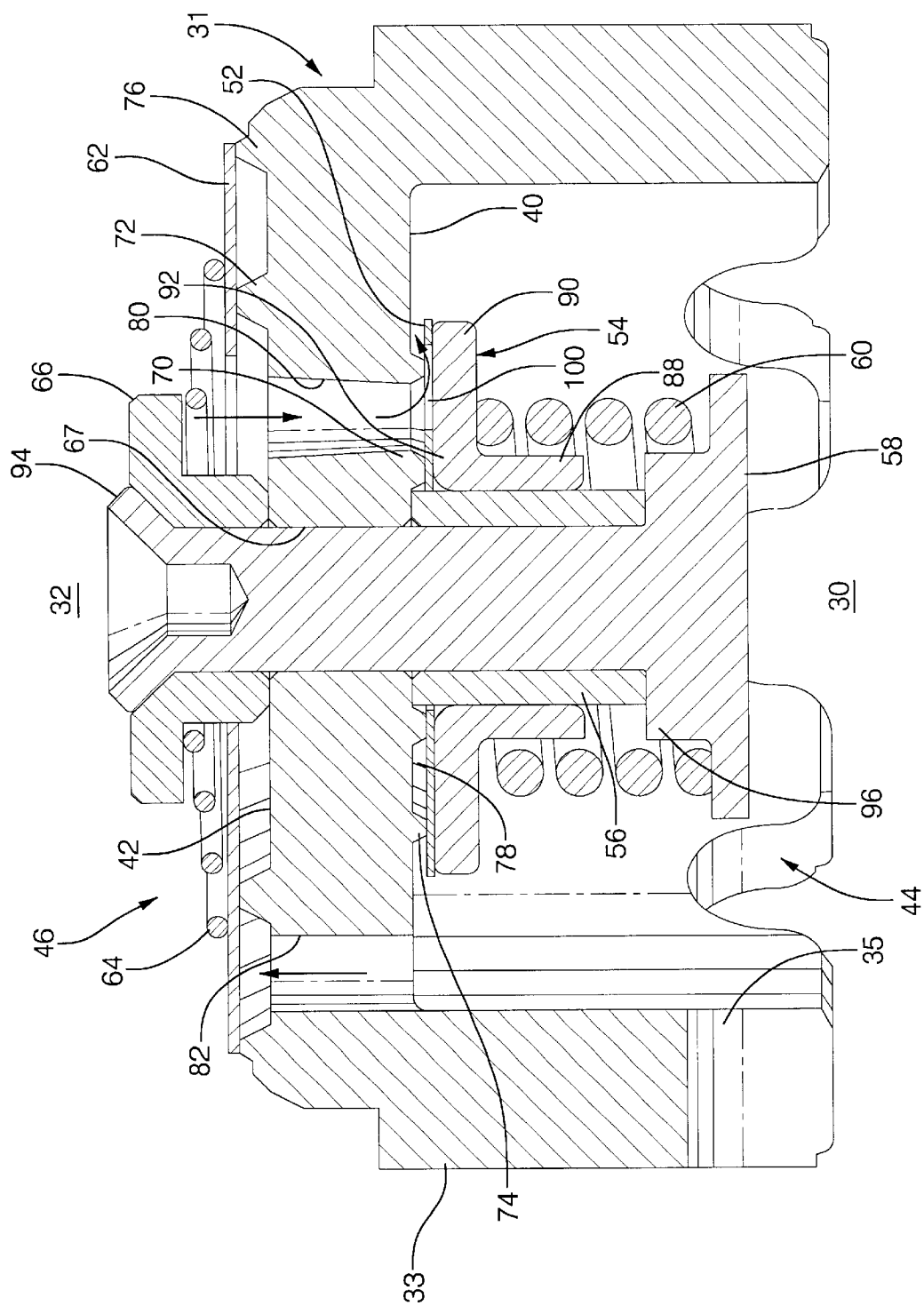
FIG. 5 is an enlarged cross-sectional view of the valve assembly of FIG. 1 shown in the closed position.

Referring to FIG. 5, the high speed bypass valve assembly 48 is movable between an open position, which is in spaced relation from the first surface 40 and abuts the back end of the rivet 58, and a closed position adjacent to the annular seats 70, 74, as shown in the Figures. The blow-off valve 54 has a hollow cylindrical portion 88 with a flange 90 extending transversely from an end 92 thereof. The blow-off valve 54 may be manufactured from steel, powdered metal or any other suitable material. The rivet 58 is partially disposed within the bore 67 and the cylindrical portion 88 for securing the blow-off valve 54 to the valve body 31. Specifically, an end 94 adjacent to the retainer 66 is deformed to secure the compression 44 and rebound 46 valve assemblies to the valve body 31. The spring 60 is interposed between the rivet 58 and the flange 90 for biasing the blow-off valve to the closed position. The cylindrical spacer sleeve 56 is disposed within the hollow cylindrical portion 88 and abuts a shoulder 96 on the rivet 58 and the first surface 40. The spacer sleeve 56 provides a bearing surface for the blow-off valve 54 as it moves between the open and closed positions.

As mentioned above, the spring 60 biases the blow-off valve 54 to the closed position. The spring 60 is installed between the rivet 58 and blow-off valve 54 with a preload sufficient to prevent the blow-off valve 54 from moving to the open position during low speed piston compression. The spring 60 preferably has a low spring rate so that once high piston speed is reached the blow-off valve will move completely to the open position. A helical spring manufactured from a wire with a circular cross-section wound in a cylindrical shaped helix accomplishes these design objectives. Changing the preload and spring rate permits the damping characteristics at high speed to be easily calibrated for different vehicle applications.

The orifice disc 52 is interposed between the annular seats 70, 74 and the high speed bypass valve assembly 48 for providing low speed bypass of fluid from the compression chamber 32 to the reservoir chamber 30 when the blow-off valve 54 is in the closed position. This is accomplished by at least one opening 100 in the orifice disc 52 which permits fluid to flow around the outer annular seat, as shown, or by coined slots, discussed above. Preferably, the orifice disc 52 abuts the annular seats 70, 74 and the flange 90 when the blow-off valve 54 is in the closed position, but additional discs may be arranged between the orifice disc 52 and the annular seats 70, 74.

In operation, during low speed compression, such as a vehicle cornering maneuver, fluid flows from the compression chamber 32 through the fluid passageways 80, into the annular channel 78 and through either an orifice disc or coined slots (indicated by the arrow in FIG. 5) to the reservoir chamber 30. During low speed rebound, fluid returns to the compression chamber 32 through the rebound passageways 82 (indicated by the arrow in FIG. 5) by deflecting the rebound disc 62 and permitting fluid to flow past the outer annular seat 76. In operation, during high speed compression, such as travelling over a pot hole in a road at relatively high vehicle speeds, the spring 60 is compressed by the high forces of the fluid against the orifice disc 52, which moves the blow-off valve 54 to the open position. In the open position, the fluid may flow rapidly from the compression chamber 32 to the reservoir chamber 30 through the passageways 80. Similarly during high speed rebound, the coil spring 64 becomes compressed by the high forces of the fluid against the rebound disc 62, thereby permitting a high rate of fluid flow from the reservoir chamber 30 to the compression chamber 32 through the rebound passageways 82.

Figure 6:
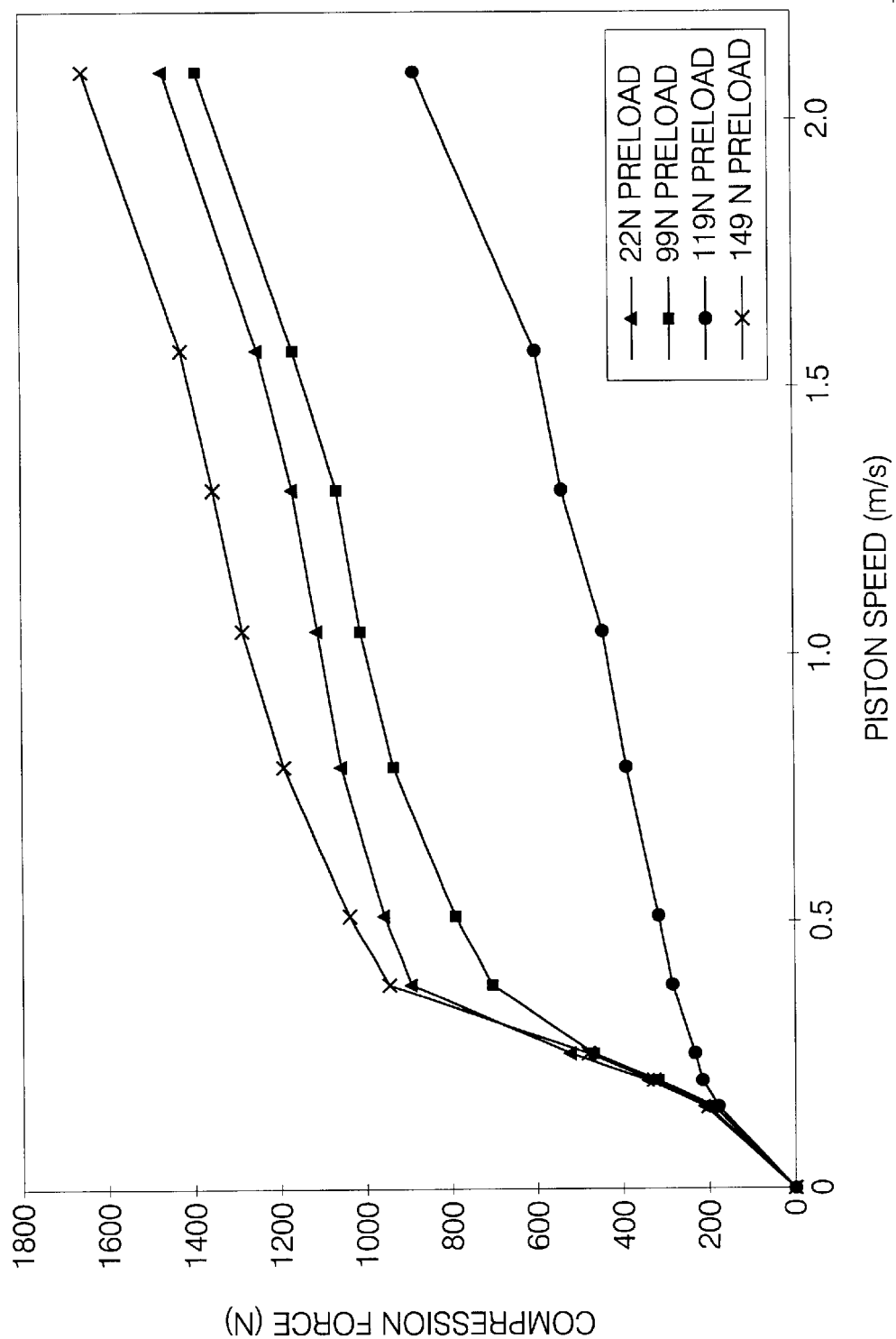
FIG. 6 is a compressor force v. piston velocity graph for a blow-off base valve having different spring preloads.
Figure 7:
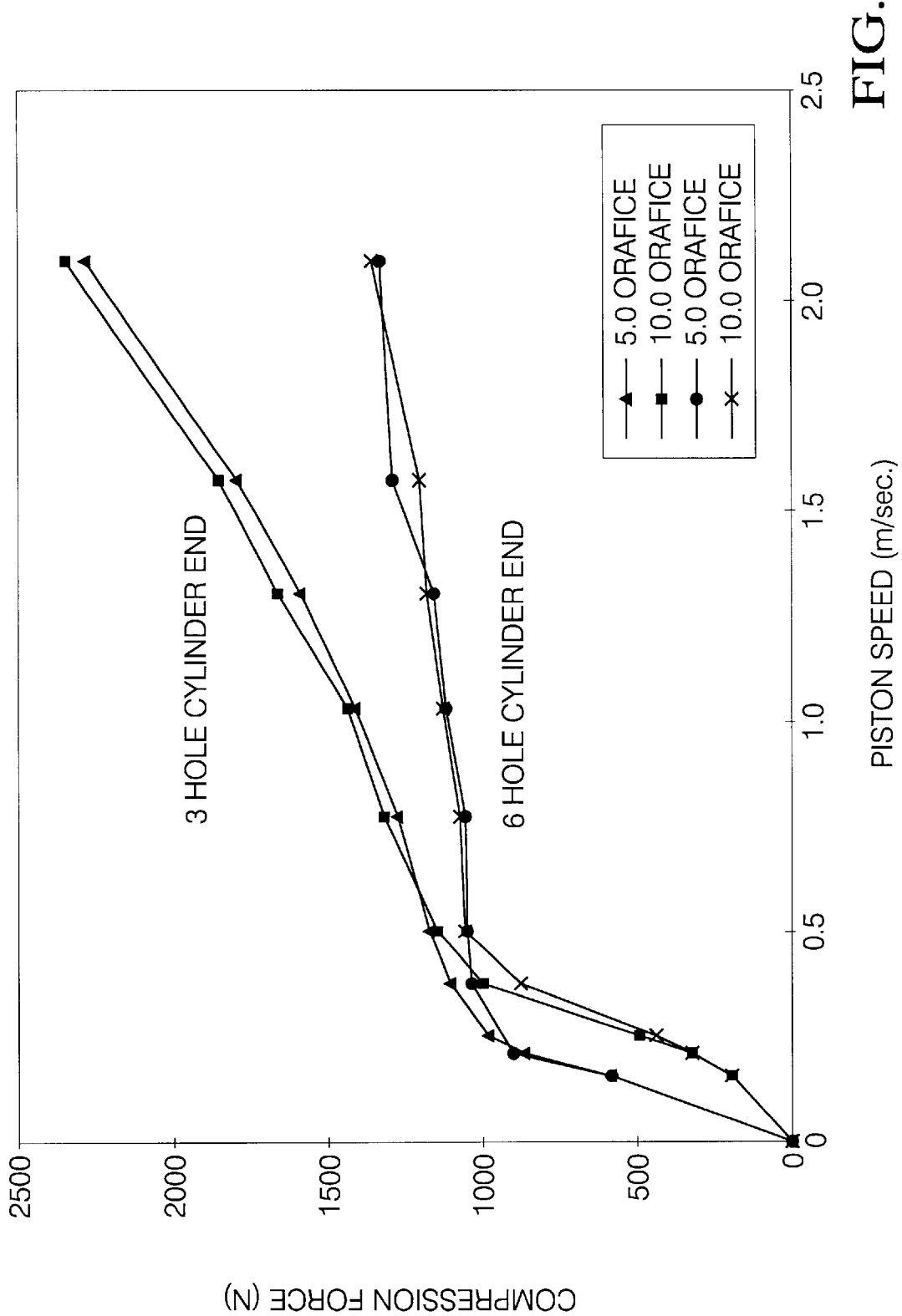
FIG. 7 is a compression force v. piston velocity graph for a blow-off base valve having a different member of fluid passageways for different sized diameters.

The damping characteristic may be further calibrated to a particular vehicle application by changing the number of fluid passageways 80, the diameter of those passageways, and the preload spring 60, as shown by the charts in FIGS. 6 and 7. As demonstrated by FIG. 6, the greater the preload the more distinct the low and high piston speed damping rates become. Low speed bypass occurs at low piston speeds under 0.4 m/s. For 119 and 149N of preload, the compression force during low speed bypass increases at a rapid rate. At about 0.4 m/s the high speed bypass valve opens and the compression force continues to increase at a rate of about one sixth of that during low speed bypass because the blow-off valve 54 has opened and the fluid flow is less restricted. Because of the low spring rate, the blow-off valve 54 moves to the open position virtually instantaneously producing a sudden change in fluid flow rates.

FIG. 7 depicts that the number of fluid passageways 80 has more of an impact on the high speed piston damping rate than the diameter of those passageways while the diameter has more of an impact on low speed piston damping rate.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A base valve assembly for regulating the flow of fluid through a twin-tube fluid vehicle damper, said assembly comprising:

a cylinder end having opposing compression and rebound surfaces;

inner and outer annular seats extending from said compression surface defining an annular channel therebetween;

at least one fluid passageway connecting said annular channel and said rebound surface for providing fluid communication therebetween;

a blow-off valve having a hollow cylindrical portion with a flange extending transversely from an end thereof with said flange adjacent said annular seats when said blow-off valve is in a closed position, said blow-off valve movable to an open position away from said compression surface;

a low speed compression bypass valve interposed between said annular channel and said blow-off valve for permitting fluid to exit said annular channel past said blow-off valve when said blow-off valve is in said closed position;

a connector for securing said blow-off valve to said cylinder end; and a helical spring interposed between said connector and said blow-off valve for biasing said blow-off valve to said closed position, wherein said cylinder end includes a central bore located interiorly of said inner annular seat, and said connector comprises a rivet partially disposed within said bore and said cylindrical portion for securing said blow-off valve to said cylinder end.

2. The assembly as set forth in claim 1 wherein fluid exits through said low speed compression bypass valve during a low speed damping condition, said blow-off valve movable to said open position during a high speed damping condition for permitting fluid to exit said annular channel past said blow-off valve at a more rapid rate than through said low speed bypass valve in said closed position.

3. The assembly as set forth in claim 2 wherein said closed position provides a first generally linear rate of flow and said open position provides a second generally linear rate of flow substantially independent of said first rate of flow.

4. The assembly as set forth in claim 2 wherein said low speed compression bypass valve comprises at least one orifice disk interposed between said flange and said annular seats.

5. The assembly as set forth in claim 4 wherein said orifice disc abuts said annular seats in said closed position.

6. The assembly as set forth in claim 5 wherein said orifice disc abuts said flange in said closed position.

7. The assembly as set forth in claim 1 further comprising a retainer in spaced relation from said rebound surface, said rivet having an end with a cylindrical depression recovered within a central hold in said retainer, said end deformed to retain said rivet and retainer onto said cylinder end.

8. The assembly as set forth in claim 1 further comprising a cylindrical spacer sleeve disposed within said hollow cylindrical portion interposed between said rivet and said blow-off valve.

9. The assembly as set forth in claim 1 wherein said at least one fluid passageway comprises a plurality of fluid passageways spaced radially about said bore.

10. The assembly as set forth in claim 9 wherein said plurality of fluid passageways comprises at least three.

11. The assembly as set forth in claim 10 wherein said plurality of fluid passageways comprises at least six.

12. Aid The assembly as set forth in claim 1 wherein said helical spring comprises a wire having a circular cross-section wound in a helix to form a cylindrical shape.

13. The assembly as set forth in claim 12 wherein said helical spring has a preload of at least 20 pounds.

14. The assembly as set forth in claim 13 wherein said preload is at least 90 pounds.

15. The assembly as set forth in claim 14 wherein said preload is at least 110 pounds.

16. The assembly as set forth in claim 15 wherein said preload is at least 140 pounds.

* * * * *